US010171471B2

(12) United States Patent
Biller et al.

(10) Patent No.: US 10,171,471 B2
(45) Date of Patent: Jan. 1, 2019

(54) EVIDENCE-BASED ROLE BASED ACCESS CONTROL

(71) Applicants: Ofer Biller, Neve Boker (IL); Oded Sofer, Jerusalem (IL); Boris Rozenberg, Ramat-Gan (IL); David Rozenblat, Nes-Harim (IL)

(72) Inventors: Ofer Biller, Neve Boker (IL); Oded Sofer, Jerusalem (IL); Boris Rozenberg, Ramat-Gan (IL); David Rozenblat, Nes-Harim (IL)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/991,958

(22) Filed: Jan. 10, 2016

(65) Prior Publication Data
US 2017/0201525 A1    Jul. 13, 2017

(51) Int. Cl.
*G06F 21/00*    (2013.01)
*H04L 29/06*    (2006.01)
*G06N 99/00*    (2010.01)

(52) U.S. Cl.
CPC ......... *H04L 63/102* (2013.01); *G06N 99/005* (2013.01); *H04L 63/08* (2013.01); *H04L 63/104* (2013.01); *H04L 63/1433* (2013.01)

(58) Field of Classification Search
CPC . H04L 63/102; H04L 63/1433; H04L 63/104; H04L 63/08; G06N 99/005
See application file for complete search history.

(56) References Cited

U.S. PATENT DOCUMENTS

| 7,380,025 | B1 * | 5/2008 | Riggins | H04L 41/0809 |
| | | | | 710/10 |
| 7,904,556 | B2 * | 3/2011 | Rymon | G06Q 10/10 |
| | | | | 707/706 |
| 7,979,463 | B2 * | 7/2011 | Durbin | G06F 21/6227 |
| | | | | 707/781 |
| 7,996,893 | B2 * | 8/2011 | Persaud-Deolall | ......... |
| | | | | H04L 63/105 |
| | | | | 705/51 |

(Continued)

FOREIGN PATENT DOCUMENTS

CN    201380058414    7/2015

OTHER PUBLICATIONS

Gal-Oz, Nurit, et al. "Mining roles from web application usage patterns." Trust, Privacy and Security in Digital Business (2011): 125-137.*

(Continued)

*Primary Examiner* — David Garcia Cervetti
(74) *Attorney, Agent, or Firm* — Daniel Kligler

(57) ABSTRACT

Methods, computing systems and computer program products implement embodiments of the present invention that include assigning, to multiple users, respective sets of original roles for accessing data stored on a computer system, and performing, in response to requests from the users, multiple operations on the data. While performing the multiple operations on the data, a transaction log is generated that includes a plurality of entries, each of the entries storing attributes of a given operation. Based on the entries in the log file, a respective set of learned roles for respective users is identified, and the respective sets of the learned roles are assigned to the respective users.

9 Claims, 6 Drawing Sheets

(56) References Cited

U.S. PATENT DOCUMENTS

| | | | | |
|---|---|---|---|---|
| 8,458,301 B1* | 6/2013 | Andrus | H04L 41/0816 | 709/220 |
| 8,983,877 B2* | 3/2015 | Chari | G06F 21/604 | 706/12 |
| 9,122,644 B2* | 9/2015 | Kruglikov | G06F 11/1471 | |
| 9,271,035 B2* | 2/2016 | Mei | G06Q 30/0276 | |
| 9,471,797 B1* | 10/2016 | Biller | G06F 21/604 | |
| 2002/0144142 A1* | 10/2002 | Shohat | G06F 21/6218 | 726/4 |
| 2003/0046576 A1* | 3/2003 | High, Jr. | H04L 63/20 | 726/1 |
| 2004/0199576 A1* | 10/2004 | Tan | H04L 29/12009 | 709/203 |
| 2004/0199792 A1* | 10/2004 | Tan | H04L 41/065 | 726/12 |
| 2004/0215975 A1* | 10/2004 | Dudfield | H04L 63/1408 | 726/25 |
| 2005/0021723 A1* | 1/2005 | Saperia | H04L 41/022 | 709/223 |
| 2005/0033989 A1* | 2/2005 | Poletto | H04L 63/1416 | 726/4 |
| 2005/0138419 A1* | 6/2005 | Gupta | G06F 21/6218 | 726/4 |
| 2005/0138420 A1* | 6/2005 | Sampathkumar | G06Q 10/10 | 726/4 |
| 2006/0184654 A1* | 8/2006 | Melo | H04L 41/0853 | 709/223 |
| 2007/0204346 A1* | 8/2007 | Meier | H04L 63/1433 | 726/25 |
| 2008/0005115 A1* | 1/2008 | Corley | G06F 21/6209 | |
| 2009/0144803 A1* | 6/2009 | Schreiber | G06F 21/6218 | 726/1 |
| 2009/0172789 A1* | 7/2009 | Band | G06F 21/604 | 726/5 |
| 2009/0234667 A1* | 9/2009 | Thayne | G06Q 10/00 | 705/300 |
| 2010/0030845 A1* | 2/2010 | Junghans | G06F 17/30306 | 709/203 |
| 2010/0115577 A1* | 5/2010 | Ratnala | G06F 21/604 | 726/1 |
| 2010/0198804 A1* | 8/2010 | Yaskin | G06F 21/6218 | 707/706 |
| 2011/0131572 A1* | 6/2011 | Elyashev | G06F 9/45533 | 718/1 |
| 2012/0131646 A1* | 5/2012 | Chandolu | G06F 21/6218 | 726/4 |
| 2012/0240194 A1* | 9/2012 | Nack Ngue | G06F 21/604 | 726/4 |
| 2012/0246098 A1* | 9/2012 | Chari | G06N 99/005 | 706/12 |
| 2013/0111583 A1* | 5/2013 | Hernandez | G06F 21/6218 | 726/21 |
| 2013/0125211 A1* | 5/2013 | Cashman | H04L 63/08 | 726/4 |
| 2013/0160076 A1* | 6/2013 | Morita | G06F 21/604 | 726/1 |
| 2014/0129268 A1* | 5/2014 | B'Far | G06Q 10/063112 | 705/7.11 |
| 2014/0196104 A1* | 7/2014 | Chari | H04L 63/20 | 726/1 |
| 2014/0215604 A1* | 7/2014 | Giblin | G06F 11/328 | 726/21 |
| 2014/0344252 A1* | 11/2014 | Kapoor | G09B 7/02 | 707/722 |
| 2015/0095250 A1* | 4/2015 | Lai | G06Q 10/105 | 705/320 |
| 2015/0163252 A1* | 6/2015 | Bhatti | G06F 21/45 | 726/1 |
| 2015/0331885 A1* | 11/2015 | Bastide | G06F 17/30165 | 707/608 |
| 2016/0036824 A1 | 2/2016 | Levit | | |
| 2017/0148336 A1* | 5/2017 | Kapoor | G09B 7/02 | |

OTHER PUBLICATIONS

Nurit Gal-Oz et al., "Mining Roles from Web Application Usage Patterns", Trust, Privacy and Security in Digital Business, vol. 6863 of the series Lecture Notes in Computer Science pp. 125-137, 2011.

Jaideep Vaidya et al., "The Role Mining Problem: Finding a Minimal Descriptive Set of Roles", In Proceedings of the 12th ACM symposium on Access control models and technologies, pp. 175-184. ACM, 2007.

Elisa Bertino et al., "Intrusion detection in RBAC-administered databases", Published in: Computer Security Applications Conference, 21st Annual Date of Conference: Dec. 5-9, 2005, pp. 10 pp. - 182.

Ashish Kamra, "Detecting anomalous access patterns in relational databases", Journal The VLDB Journal—The international Journal on Very Large Data Bases archive, vol. 17 Issue 5, Aug. 2008, pp. 1063-1077.

* cited by examiner

EVIDENCE-BASED ROLE BASED ACCESS CONTROL

FIELD OF THE INVENTION

The present invention relates generally to role-based access control, and specifically to performing data mining on a system transaction log in order to find appropriate roles and permissions for users of a computer system.

BACKGROUND

Role-Based Access Control (RBAC) is a system that controls which users have access to resources based on the role of the user. Access rights are typically grouped by role name, and access to resources can be restricted to users who have been authorized to assume the associated role. For example, if a RBAC system were used in a hospital, each person that is allowed access to the hospital's network has a predefined role (doctor, nurse, lab technician, administrator, etc.). If someone is defined as having the role of doctor, than that user can access only resources on the network that the role of doctor has been allowed access to. Each user can be assigned one or more roles, and each role can be assigned one or more privileges to users in that role.

The description above is presented as a general overview of related art in this field and should not be construed as an admission that any of the information it contains constitutes prior art against the present patent application.

SUMMARY

There is provided, in accordance with an embodiment of the present invention a method, including assigning, to multiple users, respective sets of original roles for accessing data stored on a computer system, performing, in response to requests from the users, multiple operations on the data, generating a transaction log including a plurality of entries, each of the entries storing attributes of a given operation, identifying, based on the entries in the log file, a respective set of learned roles for respective users, and assigning the respective sets of the learned roles to the respective users.

There is also provided, in accordance with an embodiment of the present invention an apparatus, including a memory configured to store multiple original roles for accessing data, and a processor configured to assign, to multiple users, respective sets of original roles, to perform, in response to requests from the users, multiple operations on the data, to generate a transaction log including a plurality of entries, each of the entries storing attributes of a given operation, to identify, based on the entries in the log file, a respective set of the learned roles for respective users, and to assign the respective sets of the learned roles to the respective users.

There is further provided, in accordance with an embodiment of the present invention a computer program product, the computer program product including a non-transitory computer readable storage medium having computer readable program code embodied therewith, the computer readable program code including computer readable program code configured to assign, to multiple users, respective sets of original roles for accessing data stored on a computer system, computer readable program code configured to perform, in response to requests from the users, multiple operations on the data, computer readable program code configured to generate a transaction log including a plurality of entries, each of the entries storing attributes of a given operation, computer readable program code configured to identify, based on the entries in the log file, a respective set of learned roles for respective users, and computer readable program code configured to assign the respective sets of the learned roles to the respective users.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for performing data mining on a transaction log (e.g., a database log file) in order to find appropriate roles and permissions for users of a computer system. As described hereinbelow, respective sets of original roles for accessing data stored on a computer system are initially assigned to multiple users. Upon multiple operations on the data being performed in response to requests from the users, a log file comprising a plurality of entries is generated, each of the entries storing attributes of a given operation. Based on the entries in the log file, a respective set of learned roles can be identified for respective users, and the respective sets of the learned roles can be assigned to the respective users.

Embodiments of the present invention also provide methods and systems for comparing the original and the learned roles in order to identify vulnerabilities and missing privileges. As described hereinbelow, one or more original roles are assigned to a user, the one or more original roles comprising first permissions for accessing data stored on a computer system. In response to requests from the user and identifying the one or more original roles, multiple operations are performed on the data, and based on the operations, one or more learned roles are defined for the user, the one or more learned roles comprising second permissions for accessing the data. A subset of the first permissions that are not in accordance with any of the second permissions, and a subset of the second permissions that are not in accordance with any of the first permissions can then be identified.

The subset of the first permissions that are not in accordance with any of the second permissions is also referred to herein as potential vulnerabilities, and the subset of the second permissions that are not in accordance with any of the first permissions is also referred to herein as potential missing privileges. In other words, the potential vulnerabilities typically comprise any permissions in the original role(s) for the given user not included in the learned role(s) for the given user, and the potential missing privileges comprise any permissions in the learned role(s) for the given user not included in the original role for the given user. The identified potential vulnerabilities and potential missing privileges can be used by a system administrator to fine-tune the original and the learned roles for the user.

System Description

Figure 1:
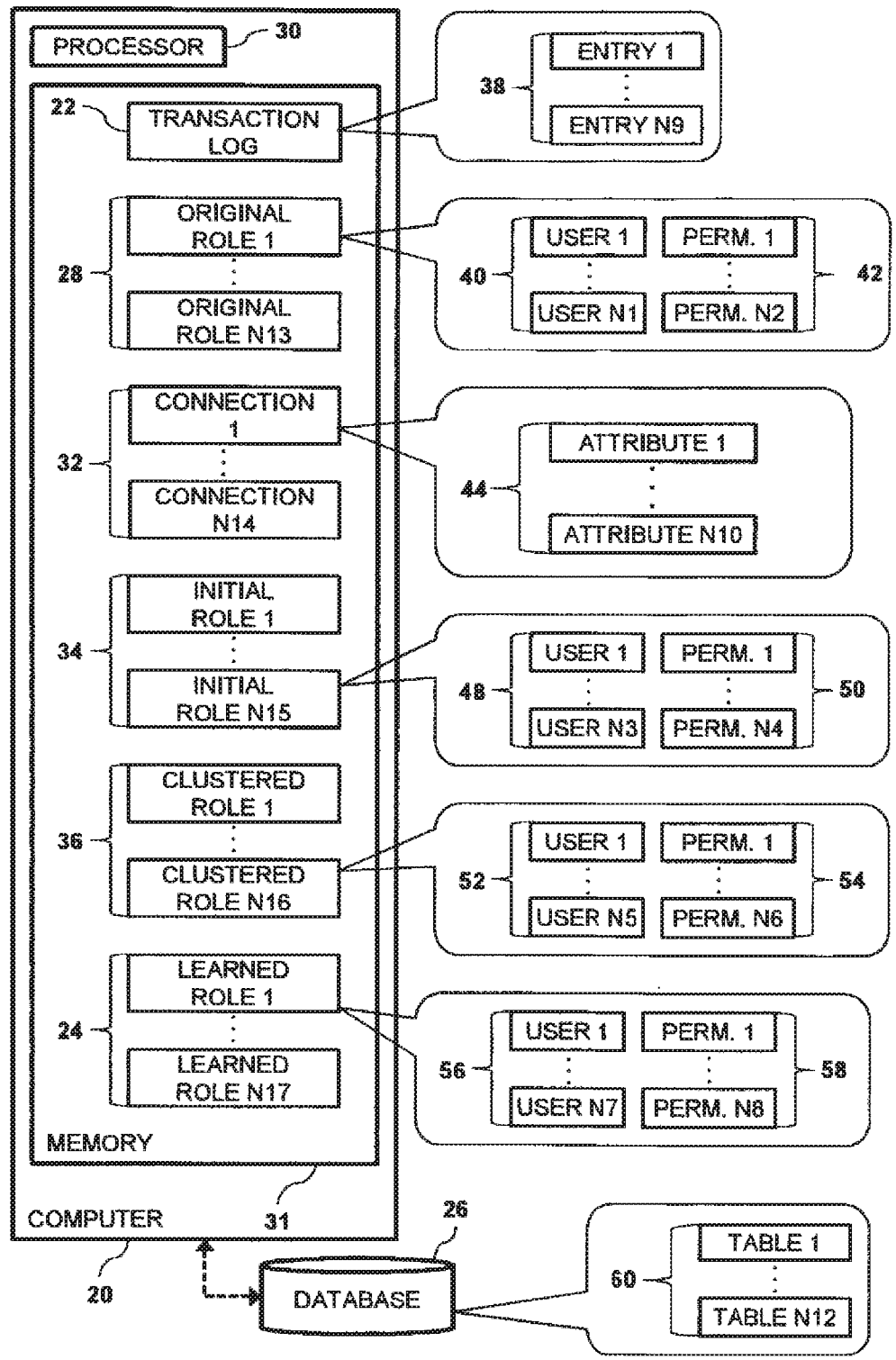
FIG. 1 is a block diagram that schematically illustrates a computer system configured to data mine a transaction log in order to define, for users having original roles, learned roles, in accordance with an embodiment of the present invention.

FIG. 1 is a block diagram that schematically illustrates a computer 20 configured to analyze a transaction log 22 in order to define learned roles 24 for users that access a database 26 using original roles 28, in accordance with an embodiment of the present invention. While the example in FIG. 1 shows computer 20 using permissions in the original and the learned roles to control user access to tables 60 in database 26, using original roles 28 and learned roles 24 to control access to any type of data is considered to be within the spirit and scope of the present invention.

Computer 20 comprises a processor 30 and a memory 31 that stores transaction log 22, original roles 28, connections 32, initial roles 34, clustered roles 36 and learned roles 24. Transaction log 22 comprises multiple entries 38, each original role 28 comprises one or more original users 40 and one or more original permissions 42, each connection 32 comprises one or more attributes 44, each initial role 34 comprises one or more initial users 48 and one or more initial permissions 50, each clustered role 36 comprises one or more clustered users 52 and one or more clustered permissions 54, and each learned role 24 comprises one or more learned users 56 and one or more learned permissions 58.

In embodiments described herein, original roles 28 may also be referred to as a set of original roles, original users 40 may also be referred to as an original set of the users, original permissions 42 may also be referred to as a set of original permissions, initial roles 34 may also be referred to as a set of initial roles, initial users 48 may also be referred to as an initial set of the users, initial permissions 50 may also be referred to as an initial of initial permissions, clustered roles 36 may also be referred to as a set of clustered roles, clustered users 52 may also be referred to as an clustered set of the users, clustered permissions 54 may also be referred to as a set of original permissions, learned roles 24 may also be referred to as a set of learned roles, learned users 56 may also be referred to as a learned set of the users, and learned permissions 58 may also be referred to as a set of learned permissions.

Database 26 comprises multiple tables 60, and upon performing an operation on a given table 60, processor 30 adds a given entry 38 to transaction log 22 describing the operation. While the configuration in FIG. 1 shows transaction log 22 stored in memory 31, storing the transaction log on any other type of storage device (e.g., a hard disk) is considered to be within the spirit and scope of the present invention.

In embodiments of the present invention, processor 30 defines a given connection 32 for each entry 38 indicating a database operation. Each connection 32 comprises one or more attributes 44 that define a logical path to one or more tables 60 accessed by the user.

For example, if a given entry 38 in transaction log 22 for a given SQL query comprises attributes (a) Application User="John", (b) Source Program="BankApp", (c) Client Host Name="Server1", (d) Client IP address= "123.42.42.23", (e) database user="client", (f) Verb= "select", (g) Object="A" and (h) Field="B", processor 30 defines a given connection 32 as "John*BankApp*Server1*123.42.42.23*client", where "*" depicts concatenation.

As described hereinbelow, processor 30 can use connections to define initial roles 34, and apply a Hierarchical Clustering algorithm to the initial roles in order to define clustered roles 36. In some embodiments, processor 30 can apply a cluster analysis to the clustered roles in order to define learned roles 24. In alternative embodiments the learned roles assigned to users may comprise initial roles 34 (i.e., by not performing the clustering algorithm and the cluster analysis) or clustered roles 36 (i.e., by not performing the cluster analysis).

Processor 30 typically comprises a general-purpose computer, which are programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 30 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Behavior-Based Role Definition

Figure 2:
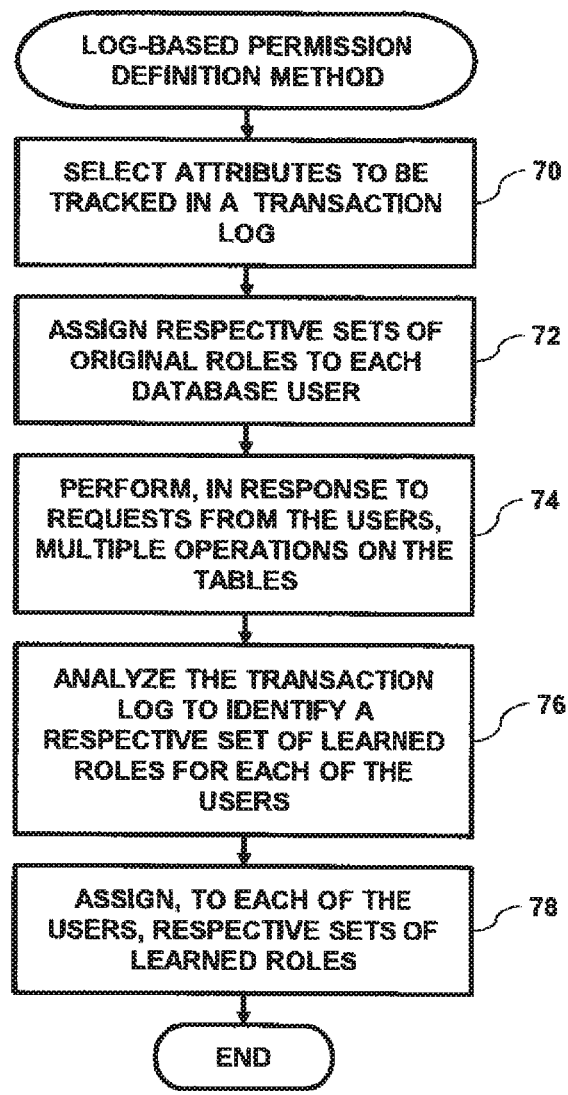
FIG. 2 is a flow diagram that schematically illustrates a method for data mining the transaction log in order to define the learned roles, in accordance with an embodiment of the present invention.

FIG. 2 is a flow diagram that schematically illustrates a method for defining learned roles 24 by data mining transaction log 22, in accordance with an embodiment of the present invention. In a selection step 70, a list of attributes to be tracked in transaction log 22 are selected, and in a first assignment step 72, processor 30 assigns respective sets of original roles 28 to original set of users 40.

In a data access step 74, in response to requests received from the users, processor 30 performs multiple data operations on the tables 60 in database 26. While performing the operations on the tables, processor 30 stores details (e.g., attributes) of each of the data operations to a given entry 38 in transaction log 22. Upon analyzing the entries, processor 30 identifies (i.e., defines) a respective set of learned roles 24 for each of the users in an analysis step 76, assigns the respective set of the learned roles 24 to each the users in a second assignment step 78, and the method ends.

In embodiments of the present invention, processor 30 can use learned permissions 58 to define learned roles 24. This can ensure that any users that are associated with a given learned role 24 are assigned an appropriate set of the learned permissions, thereby reducing the need for requesting any additional privileges from a system administrator. Additionally, deriving learned roles 24 from transaction log 22 can limit learned permissions 58 to the permissions that the users need.

Figure 3:
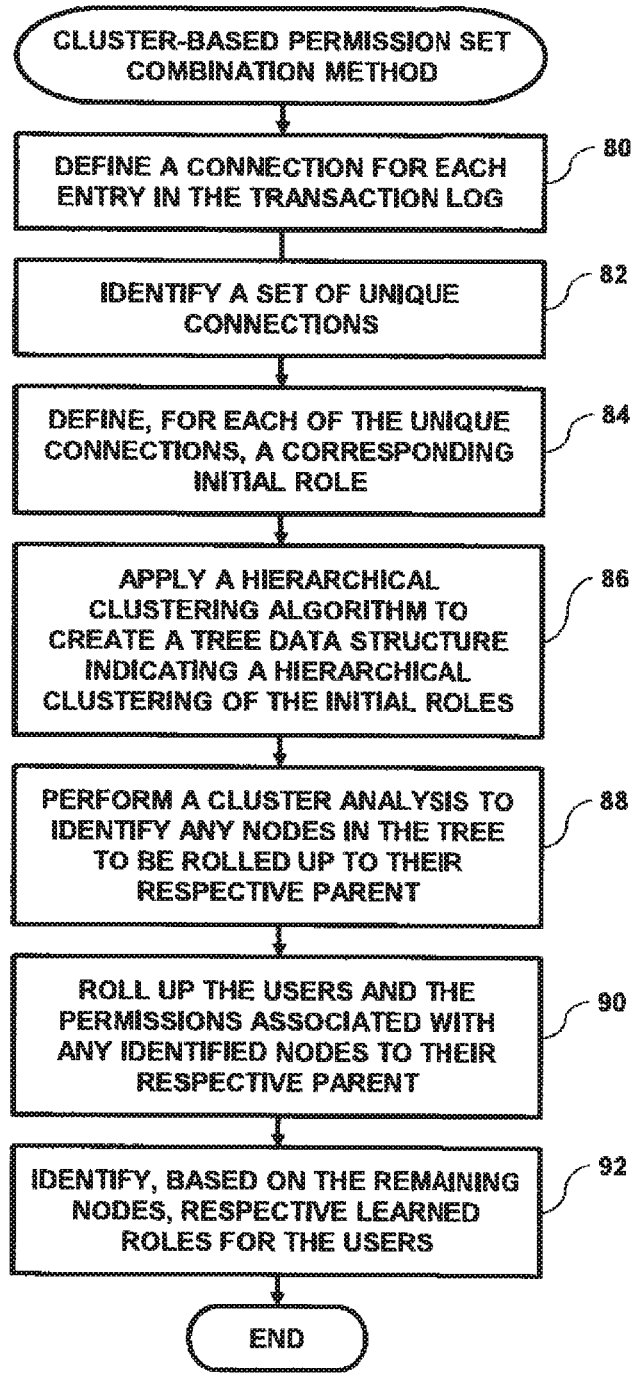
FIG. 3 is a flow diagram that schematically illustrates a method for using a Hierarchical Clustering algorithm to generate the learned roles, in accordance with an embodiment of the present invention.
Figure 4:
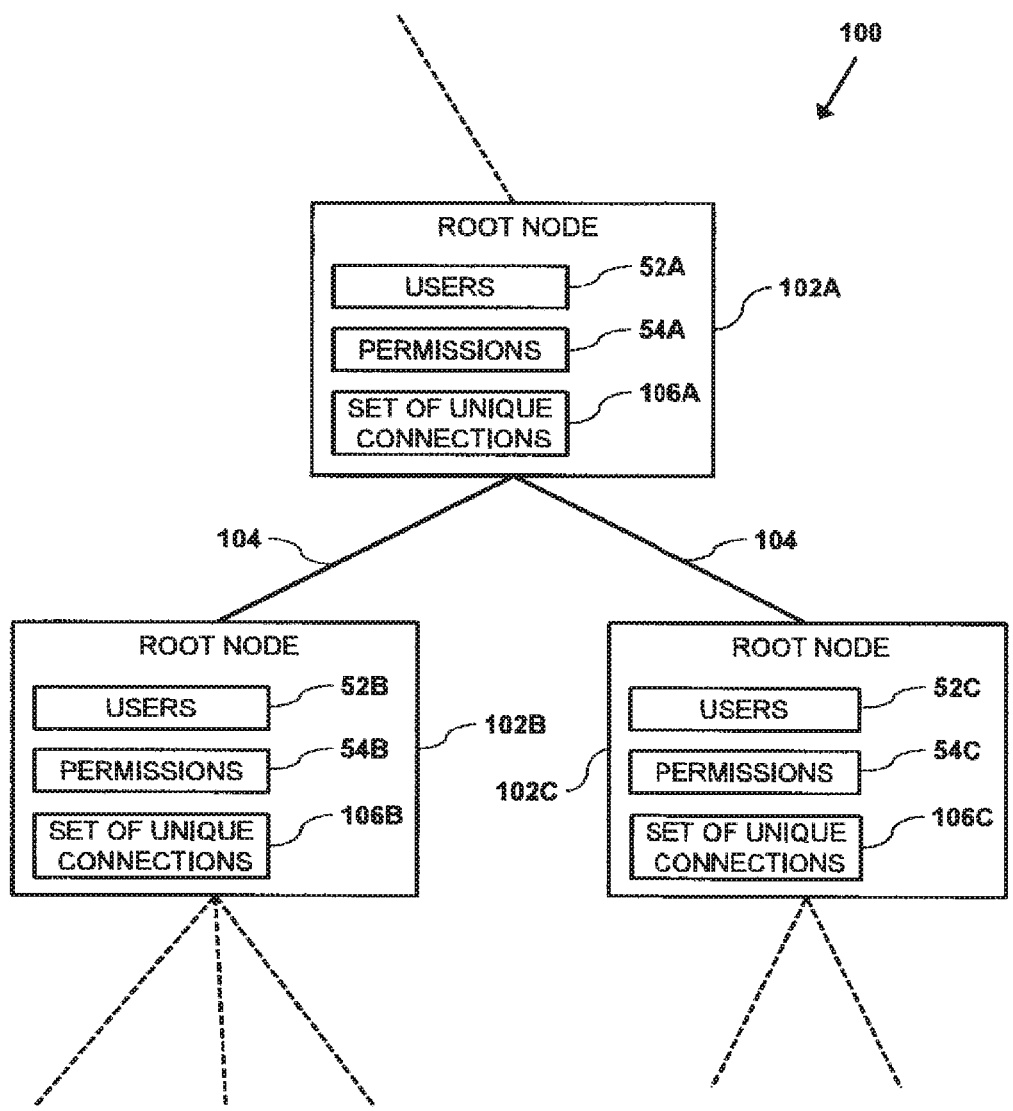
FIG. 4 is a block diagram that schematically illustrates a tree data structure created by the Hierarchical Clustering algorithm, in accordance with an embodiment of the present invention.

FIG. 3 is a flow diagram that schematically illustrates a method for using a Hierarchical Clustering algorithm and a cluster analysis to define learned roles 24, and FIG. 4 is a block diagram of a tree data structure 100 that can be used by the Hierarchical Clustering algorithm, in accordance with an embodiment of the present invention. The steps described in the flow diagram shown in FIG. 3 can be used to analyze transaction log 22 and to define learned roles 24 (i.e., as described supra for step 76 in FIG. 2).

In a first definition step 80, using embodiments described supra, processor 30 defines a given connection 32 for each entry 38, and in an identification step 82, the processor identifies a set of unique connections 32. In a second definition step 84, based on the set of the unique connections, processor 30 defines initial roles 34 (i.e., comprising permissions 50) in a one-to-one correspondence with the set of the unique connections, and in a clustering step 86, processor 30 applies the Hierarchical Clustering algorithm to create tree 100 that represents a hierarchical clustering of the initial roles (i.e., permissions 50).

As shown in FIG. 4, tree data structure 100 comprises multiple nodes 102 connected by edges 104. In FIG. 4, nodes 102 and their respective data elements are differentiated by appending a letter to the identifying numeral, so that the nodes shown in FIG. 4 comprise nodes 102A-102C. Initially, each node 102 comprises a set of clustered users 52, a set of clustered permissions 54 and a set of connections 106 comprising unique connections 32 that were combined during the cluster analysis.

Returning to the flow diagram, in an analysis step 88, processor 30 performs a cluster analysis (i.e., on nodes 102 representing clustered roles 36) to identify any nodes 102 whose users 52 and sets of permissions 54 can be "rolled up" to the respective parent node (e.g., roll up node 102C to node 102A). The cluster analysis described hereinbelow starts with nodes 102 that are "leaf nodes" and continues until either the root node of tree 100 is processed or if there are no remaining nodes 102 that can be considered to be rolled up.

For purposes of simplicity, the following description of the cluster optimization algorithm uses child nodes 102B and 102C for parent node 102A. For nodes 102B and 102C, processor 30 can perform the following analysis to decide whether to keep nodes 102B And 102C as child nodes of node 102A, or to roll up nodes 102B and 102C into node 102A:

1. Create centroid c for the node 102A: $c=<p1, p2, \ldots, pk>$, where k is the number of permissions in the node and pi ($1<=i<=k$) is a probability of permission i in the node.
2. Calculate Pi by summing the number of connections in the node that demonstrated the permission i, and dividing this number by the total number of connections in the node.
3. Calculate a distance d to the centroid for each connection in the node (e.g. a Euclidian distance).
4. Calculate an average (m) and standard deviation (std) of all the distances calculated in the previous step (i.e., step 3).
5. Find all connections cj, $1<=j<=k$ with too large of a distance to the centroid: $dj>m+THRESH*std$, where THRESH is a parameter (e.g. 3).
6. If the percent of connections with too large distance to centroid greater than a predefined threshold (e.g. 5%), than it may be preferable (i.e., in a first case) to remain with nodes 102B and 102C as two separate learned roles 24. Otherwise it may be preferable to have node 102A as a given (i.e., rolled up) clustered role 36. In the first case, processor 30 can indicate that there is no need to continue with the parent node. In other words, if the cluster analysis decides to maintain nodes 102B and 102C as separate modified clustered roles 36, there is no need to try to decide what if it is preferable to keep (a) nodes 102B and nodes 102C, or (b) node 102A.

Returning to the flow diagram, in a roll-up step 90, processor 30 rolls up, to their respective parent node 102, the users and the permissions of any of the nodes identified by the cluster analysis described supra, and in a fourth definition step 92, the processor defines, based on the remaining nodes in tree 100, learned roles 24 comprising the learned sets of the permissions and learned set of users. In embodiments described herein, processor 30 creates a first (i.e., an initial) tree 100 in step 86, and creates a second (i.e., an updated) tree 100 in step 90.

Figure 5:
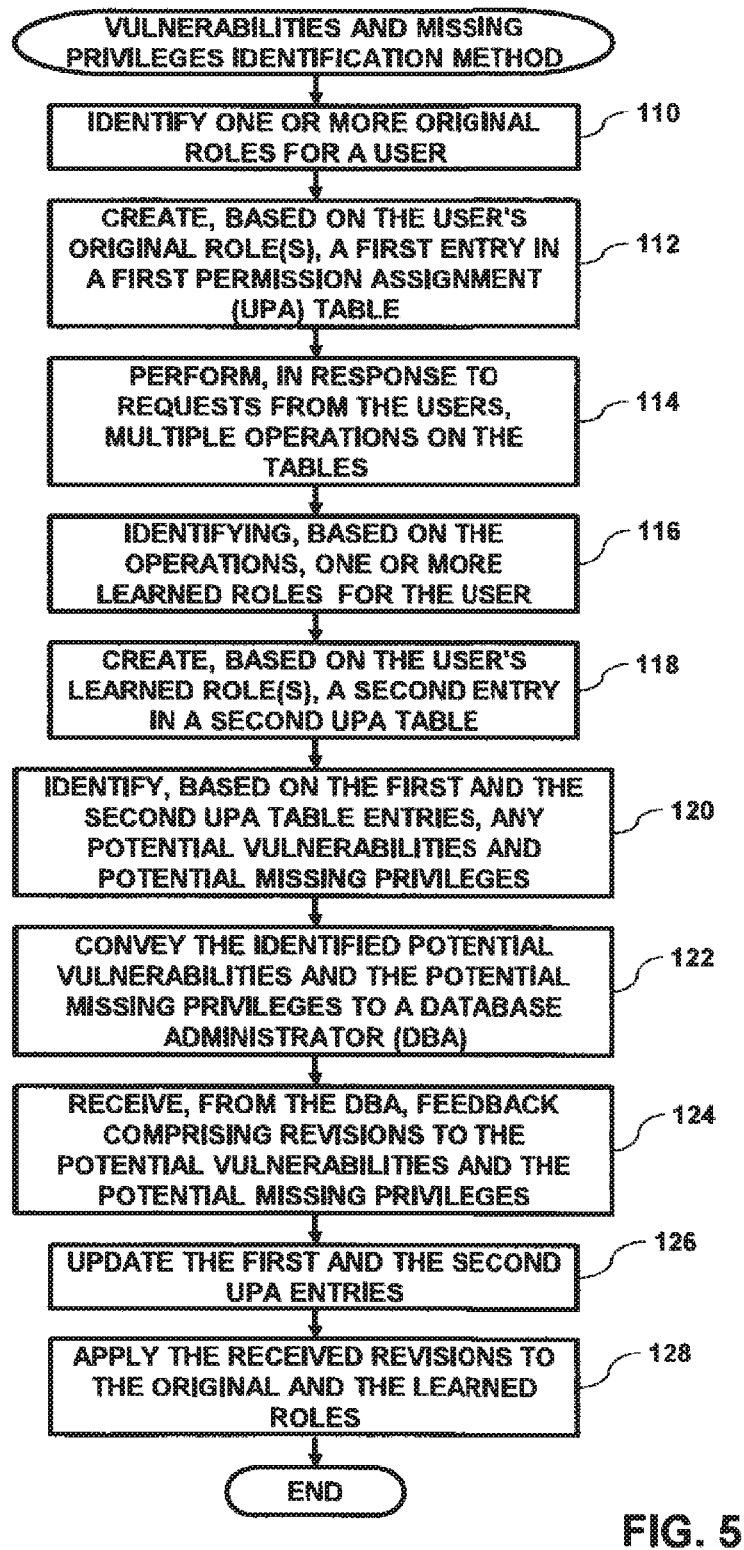
FIG. 5 is a flow diagram that schematically illustrates a method for detecting vulnerabilities and missing privileges in the original roles, in accordance with an embodiment of the present invention.
Figures 6, 7:
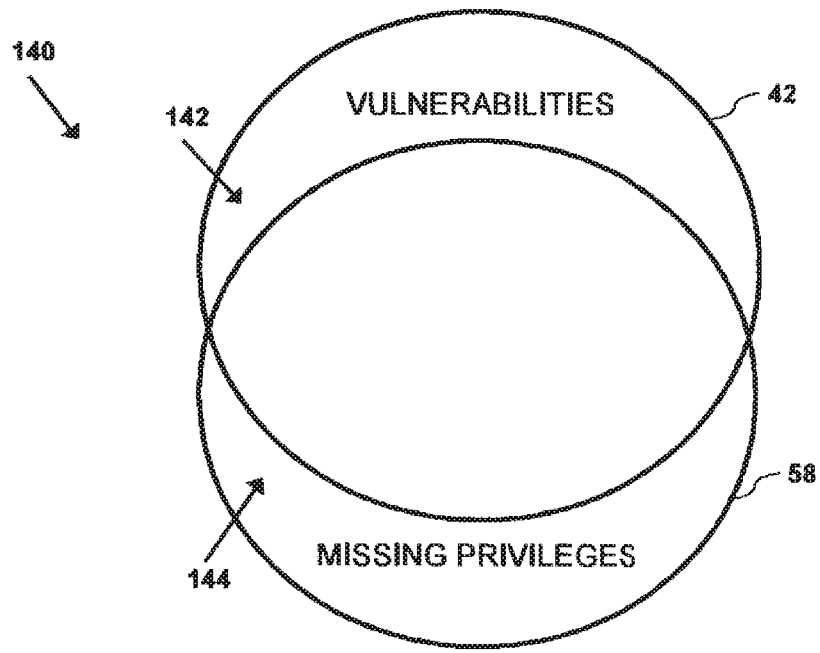
FIG. 6 is a block diagram that schematically illustrates user permission assignment (UPA) for the original and the learned roles.
FIG. 7, is a Venn diagram that illustrates the vulnerabilities and the missing privileges in a given original role and a given learned role, in accordance with an embodiment of the present invention.

FIG. 5 is a flow diagram that schematically illustrates a method for identifying, for a given user, vulnerabilities and missing privileges in a given set of the original privileges and a set of the learned privileges, and FIG. 6 is a block diagram that schematically illustrates user to permission assignment (UPA) tables 130 in accordance with an embodiment of the present invention. In FIG. 6, UPA tables 130 and their respective data elements are differentiated by appending a letter to the identifying numeral, so that the UPA tables shown in FIG. 6 comprise UPA tables 130A and 130B.

In a first identification step 110, processor 30 identifies one or more original roles 28 for the given user, and in a first creation step 112, the processor uses permissions 42 in the one or more original roles to create a given entry (i.e., row) for the given user in UPA table 130A. In UPA table, each row represents permissions 136 for a given user 132, and each column represents a given permission identification 134. In a given UPA row for a given user, any given column whose marked with a specified value (e.g., "1") indicates that the given user has been granted a given permission referenced by a given permission identification 134.

In an access step 114, processor 30 performs multiple data operations on table 60 in response to request from the given user, and in a second identification step 116 the processor identifies, for the given user, on or more learned roles 24. For example, processor 30 can define the one or more learned roles using embodiments described in the description referencing FIGS. 1 and 3 hereinabove. In a second creation step 118, processor 30 uses permissions 58 in the one or more learned roles to create a given entry for the given user in UPA table 130B.

In a third identification step 120, processor 30 compares the entries for the given user in UPA tables 130A and 130B, and identifies any potential vulnerabilities and potential missing privileges. In embodiments of the present invention, the potential vulnerabilities comprise original permissions 42 for the given user that are not in accordance with any learned permissions 58 for the given user, and the potential missing privileges comprise learned privileges 58 for the given user that are not in accordance with any original permissions 42 for the given user.

In a convey step 122, processor 30 conveys the identified potential vulnerabilities and missing privileges to a user such as a database administrator (DBA), a system administrator and a security officer. Upon receiving and analyzing the identified vulnerabilities and missing privileges, the user can convey feedback comprising revisions to the potential vulnerabilities and the potential missing privileges. In response to receiving the revisions, in a receive step 124, processor 30 can, in an update step 126, update the entries for the given user in UPA tables 130A and 130B, and apply the revisions to the original and the learned roles for the given user in an application step 128, and the method ends. In some embodiments, processor 30 can apply a Role Mining algorithm (e.g., Fast Miner) on the updated UPAs to create the revised original and the revised learned roles. In some embodiments, the revised original roles can be referred to as final original roles, and the revised learned roles may be referred to as final learned roles.

FIG. 7 is a Venn diagram 140 that schematically illustrates the potential vulnerabilities and the missing potential privileges of a given set of original permissions 42 and a set of learned permissions 58 for a given user, in accordance with an embodiment of the present invention. In the Venn diagram, the potential vulnerabilities are shown in region 142 that comprises (original permissions 42)\(learned permissions 58)  (1)

which indicates a set difference of the set of the original permissions and the set of the learned permissions, and the potential vulnerabilities are shown in region 144 that comprises (learned permissions 58)\(original permissions 42)  (2)

which indicates a set difference of the set of the learned permissions and the set of the original permissions.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for assigning roles to multiple users of a computer system, comprising:
assigning, to the multiple users, respective sets of original roles for accessing data stored on the computer system;
performing, in response to requests from the multiple users, multiple operations on the data;
generating a transaction log file comprising a plurality of entries, each of the entries storing attributes of a given operation;
identifying, by a processor based on the entries in the log file, a respective set of learned roles for each of the multiple users by defining, for each transaction log entry, a connection comprising one or more of the attributes and indicating a path from one of the multiple users to a given table accessed by the one of the users, identifying a unique set of the connections, defining a set of initial roles in a one-to-one correspondence with the unique set of the connections, each of the initial roles comprising an initial set of the users and a set of initial permissions, and applying, by the processor to the initial roles, a Hierarchical Clustering algorithm to identify the set of learned roles, each of the learned roles comprising a set of clustered permissions and associated with a subsequent set of the users;
assigning, to each given user, the respective sets of the learned roles associated with the given user; and
restricting, to the multiple users based on their respective assigned learned roles, access to the data on the computer system.

2. The method according to claim 1, wherein the data comprises a database comprising one or more tables, and wherein the original and the learned roles comprise access permissions for each of the tables.

3. The method according to claim 1, wherein applying the Hierarchical Clustering algorithm comprises creating a first tree data structure comprising nodes representing the initial roles, and comprising performing a cluster analysis on the learned roles to identify any of the nodes that can be rolled up to their respective parent nodes, and rolling up the identified nodes to their respective parent nodes, thereby creating a second tree data structure, and wherein the learned roles comprise the roles represented by the second tree data structure.

4. An apparatus for assigning roles to multiple users of a computer system, comprising:
a memory configured to store multiple original roles for accessing data; and
a processor configured:
to assign, to the multiple users, respective sets of original roles,
to perform, in response to requests from the multiple users, multiple operations on the data,
to generate a transaction log file comprising a plurality of entries, each of the entries storing attributes of a given operation,
to identify, based on the entries in the log file, a respective set of the learned roles for each of the multiple users by defining, for each transaction log entry, a connection comprising one or more of the attributes and indicating a path from one of the multiple users to a given table accessed by the one of the users, identifying a unique set of the connections, defining a set of initial roles in a one-to-one correspondence with the unique set of the connections, each of the initial roles comprising an initial set of the users and a set of initial permissions, and applying, to the initial roles, a Hierarchical Clustering algorithm to identify the set of learned roles, each of the learned roles comprising a set of clustered permissions and associated with a subsequent set of the users,
to assign, to each given user, the respective sets of the learned roles associated with the given user, and
to restrict, to the multiple users based on their respective assigned learned roles, access to the data on the computer system.

5. The apparatus according to claim 4, wherein the data comprises a database comprising one or more tables, and wherein the original and the learned roles comprise access permissions for each of the tables.

6. The apparatus according to claim 4, wherein the processor is configured to apply the Hierarchical Clustering algorithm by creating a first tree data structure comprising nodes representing the initial roles, and wherein the processor is configured to perform a cluster analysis on the learned roles to identify any of the nodes that can be rolled up to their respective parent nodes, and to roll up the identified nodes to their respective parent nodes, thereby creating a second tree data structure, and wherein the learned roles comprise the roles represented by the second tree data structure.

7. A computer program product for assigning roles to multiple users of a computer system, the computer program product comprising:

a non-transitory computer readable storage medium having computer readable program code embodied therewith, the computer readable program code comprising:

computer readable program code configured to assign, to the multiple users, respective sets of original roles for accessing data stored on the computer system;

computer readable program code configured to perform, in response to requests from the multiple users, multiple operations on the data;

computer readable program code configured to generate a transaction log file comprising a plurality of entries, each of the entries storing attributes of a given operation;

computer readable program code configured to identify, based on the entries in the log file, a respective set of learned roles for each of the multiple users by defining, for each transaction log entry, a connection comprising one or more of the attributes and indicating a path from one of the multiple users to a given table accessed by the one of the users, identifying a unique set of the connections, defining a set of initial roles in a one-to-one correspondence with the unique set of the connections, each of the initial roles comprising an initial set of the users and a set of initial permissions, and applying, to the initial roles, a Hierarchical Clustering algorithm to identify the set of learned roles, each of the learned roles comprising a set of clustered permissions and associated with a subsequent set of the users;

computer readable program code configured to assign, to each given user, the respective sets of the learned roles associated with the given user; and computer readable program code configured to restrict, to the multiple users based on their respective assigned learned roles, access to the data on the computer system.

8. The computer program product according to claim 7, wherein the data comprises a database comprising one or more tables, and wherein the original and the learned roles comprise access permissions for each of the tables.

9. The computer program product according to claim 7, wherein the computer readable program code is configured to applying the Hierarchical Clustering algorithm by creating a first tree data structure comprising nodes representing the initial roles, and comprising computer readable program code configured to perform a cluster analysis on the learned roles to identify any of the nodes that can be rolled up to their respective parent nodes, and to roll up the identified nodes to their respective parent nodes, thereby creating a second tree data structure, and wherein the learned roles comprise the roles represented by the second tree data structure.

* * * * *